United States Patent [19]

Smith et al.

[11] Patent Number: 4,950,439
[45] Date of Patent: Aug. 21, 1990

[54] GLOSSY FINISH FIBER REINFORCED MOLDED PRODUCT

[75] Inventors: Rayna W. Smith, Harrisburg, Pa.; Glen W. Saidla, Stratham, N.H.

[73] Assignee: C. H. Masland & Sons, Carlisle, Pa.

[21] Appl. No.: 71,969

[22] Filed: Jul. 10, 1987

[51] Int. Cl.$^5$ .................. B29C 51/02; B29C 51/04; B32B 31/20; B32B 33/00

[52] U.S. Cl. .................................. 264/294; 428/184; 428/286; 428/287; 428/288; 428/296; 428/409; 428/34.5; 428/34.7; 428/36.1; 428/182; 156/182; 156/205; 156/224; 156/245; 156/288; 156/308.2; 264/112; 264/119; 264/122; 264/257; 264/258; 264/320; 264/331.17; 264/331.19; 264/331.21; 264/DIG. 64; 264/DIG. 66; 264/DIG. 75; 264/DIG. 76

[58] Field of Search ............... 428/296, 288, 409, 286, 428/287, 182, 184; 156/182, 205, 224, 245, 288, 308.2; 264/112, 119, 122, 257, 258, 294, 320, 331.17, 331.19, 331.21, DIG. 64, DIG. 66, DIG. 75, DIG. 76

[56] References Cited

U.S. PATENT DOCUMENTS

| | | | |
|---|---|---|---|
| 2,483,405 | 10/1949 | Francis | 428/296 |
| 3,850,723 | 11/1974 | Ackley | 264/136 |
| 4,044,188 | 8/1977 | Segal | 428/409 |
| 4,098,943 | 7/1978 | Degginger | 428/409 |
| 4,263,364 | 4/1978 | Seymour | 428/430 |
| 4,269,884 | 5/1981 | DellaVecchia et al. | 428/247 |
| 4,379,801 | 4/1983 | Weaver et al. | 428/341 |
| 4,379,802 | 4/1983 | Weaver et al. | 428/341 |
| 4,474,846 | 10/1984 | Doerer et al. | 428/288 |
| 4,568,581 | 2/1986 | Peoples | 428/409 |
| 4,716,072 | 12/1987 | Kim | 428/409 |

FOREIGN PATENT DOCUMENTS 826012 12/1959 United Kingdom .

*Primary Examiner*—James C. Cannon
*Attorney, Agent, or Firm*—Nixon & Vanderhye

[57] ABSTRACT

Described are smooth, glossy finished fiber reinforced thermoplastic prepreg materials composed of reinforcement fibers impregnated with and surrounded by thermoplastic. Prior to consolidation, the material preferably consists of thermoplastic fibers and reinforcing fibers, intimately blended together. When heated, with the aid of pressure, the thermoplastic fibers melt, surround and impregnate the reinforcing fibers and provide a smooth, glossy finish to the reinforced article. Excellent surface appearance and the ability to accommodate high-speed processing characterize the prepreg materials of this invention.

21 Claims, 1 Drawing Sheet

GLOSSY FINISH FIBER REINFORCED MOLDED PRODUCT

FIELD OF THE INVENTION

This invention relates to reinforced thermoplastic molding materials in which the reinforcement is impregnated with a thermoplastic.

BACKGROUND OF THE INVENTION

Reinforced plastic materials, particularly fiber-reinforced plastic materials, have been prepared by various procedures in which the plastic is pre-impregnated into a fibrous reinforcement. The plastic used as the continuous phase is usually of the thermoset type with chopped or relatively short reinforcing fibers distributed uniformly in the plastic matrix. A limited number of thermoplastic-based reinforced systems are known, for instance as a liquid plastic added to a fibrous bat or in a film stacking process in which alternating layers of fibrous reinforcement and thermoplastic film are plied one atop the other and then consolidated with heat and pressure to form a consolidated laminated article.

To the best of our knowledge, a fiber reinforced thermoplastic prepreg material containing a substantial, functionally significant amount of fiber reinforcement presenting a smooth, glossy, cosmetically attractive surface has not been described. The thermoplastic properties of the prepreg material allow forming and processing procedures not possible with thermosetting reinforced materials. The fiber reinforced thermoplastic prepreg materials of this invention may be thermoformed into a final shape with heat and pressure in a single step or previously consolidated prepregs may be heated and formed in conventional (unheated) metal forming presses.

SUMMARY OF THE INVENTION

Described are smooth, glossy finished fiber reinforced thermoplastic prepreg materials composed of reinforcement fibers impregnated with and surrounded by thermoplastic. Prior to consolidation, the material preferably consists of thermoplastic fibers and reinforcing fibers, intimately blended together. When heated, with the aid of pressure, the thermoplastic fibers melt, surround and impregnate the reinforcing fibers and provide a smooth, glossy finish to the reinforced article. Excellent surface appearance and the ability to accommodate high-speed processing characterize the prepreg materials of this invention.

DETAILED DESCRIPTION OF THE DRAWINGS

Figure 1:
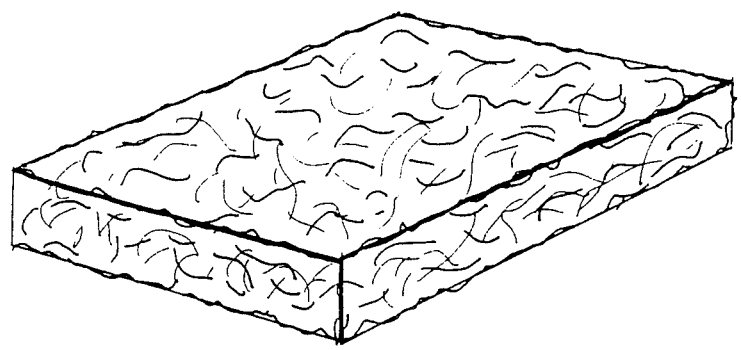
FIG. 1 is an elevated perspective view of an unconsolidated bat of an intimate blend of thermoplastic and reinforcing fibers arranged in a continuous web.
Figure 2:
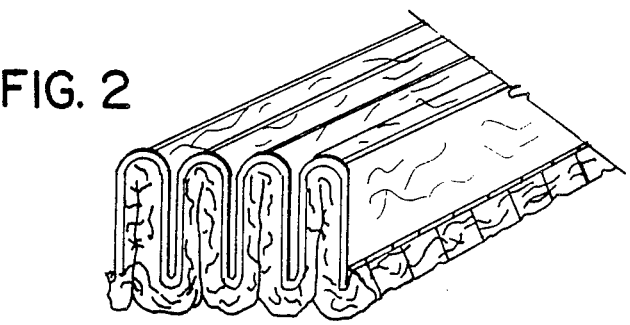
FIG. 2 is an elevated perspective view in partial cross-section of an unconsolidated corrugated web of an intimate blend of thermoplastic and reinforcing fibers.
Figure 3:
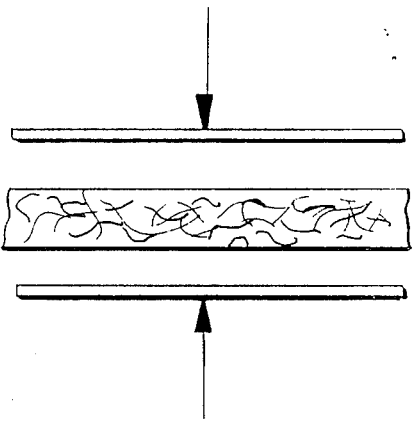
FIG. 3 is a cross-sectional schematic illustration of consolidating a continuous or corrugated fibrous web.
Figure 4:
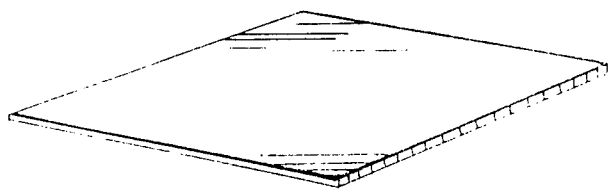
FIG. 4 is an elevated perspective view of the resulting fiber reinforced thermoplastic product.

The attached Figures illustrate successive steps in preparing a glossy finish fiber reinforced molded product according to the invention. An intimate blend of discrete reinforcing fibers and thermoplastic fibers thoroughly intermixed with each other is laid or arranged into a continuous web (FIG. 1); this web is optionally corrugated to provide a much higher fiber weight per square unit of surface area or a plurality of webs plied then corrugated as in FIG. 2. The web or corrugated web as the case may be, is pressed with heat as illustrated in FIG. 3 to consolidate the web, force the thermoplastic to fully impregnate the reinforcing fibers and to provide the smooth, glossy surface desired. A fully consolidated, glossy sheet fiber reinforced molded sheet (FIG. 4) results.

DETAILED DESCRIPTION OF THE INVENTION

Fiber reinforced molded products having a smooth, glossy finish are prepared by consolidating a web of intimately blended and mixed discrete reinforcing fibers and discrete thermoplastic fibers in a reinforcing fiber to thermoplastic fiber weight ratio of about 10:90 to about 60:40. Preferably the web is corrugated prior to consolidation: additional thermoplastic in the form of powder may be added to the web prior to consolidation.

Consolidated fiber reinforced molded sheets and three dimensional objects having a glossy surface at least in excess of 20 at 20° measurement, preferably in the range of 40 to 60 at 20° measurement, are consistently obtained. Unconsolidated fibrous webs of blended discrete reinforcing fibers and discrete thermoplastic fibers having a melt index of from 5 to about 500 and the molded products consolidated from such webs are also described.

The glossy finish fiber reinforced molded product is made from a fiber reinforced thermoplastic prepreg using various procedures. According to a first embodiment, a thermoplastic fiber of any particular type, preferably having a melt index in the range of 30 to 50, is blended with a reinforcement fiber until the fibers are uniformly distributed. Glass fibers, graphite fibers, aramid fibers such as KEVLAR ® (DuPont), steel and coated fibers such as metal coated glass may serve as the reinforcing fibers. Although mixtures of two or more of these fiber types may be used, usually only one type of fiber is selected. The reinforcing fibers represent from about 10 to about 60% of the total fiber weight of the prepreg, With a reinforcement fiber content of about 25% being preferred. The balance is represented by the thermoplastic fibers. Thermoplastic fibers suitable for the invention may be from any thermoplastic capable of being formed into a fiber, e.g., polypropylene, polypropylene copolymers, polyethylene, polyethylene copolymers, segmented polyurethane elastomers, polyester and nylon fibers. Following intimate mixing, the fibers are then laid into a fiber mat or web on air-lay equipment with the fiber pattern or orientation determined by the air-laying equipment. Preferably, the web is arranged in a corrugated style as described in U.S. Pat. No. 4,576,583. The corrugated web is then subjected to further processing, as explained in more detail below. In a second embodiment, the same types of fibers are selected and intimately blended together; however, the web is not corrugated—it is simply taken off of the conveyor after air laying and held in inventory for further processing.

The blended fibers, corrugated or otherwise, are placed in a press maintained above the melting point of the thermoplastic fiber, the press is closed and the fiber mass is subjected to pressure, for instance 10 psi, for a brief period of time in order to cause the thermoplastic fibers to melt, spread evenly throughout and uniformly impregnate the reinforcement fiber mass and to form a smooth, glossy coherent surface on both faces of the shaped article.

The blended fiber webs or corrugated webs may be formed into three dimensional objects with heat and pressure or consolidated into flat sheets or rolls as flat stock for later pressing and forming operations. Consolidated sheets have a considerably smaller volume and are more convenient to handle than the fibrous webs.

Included within the invention are unconsolidated webs and corrugated, unconsolidated webs as intermediate products supplied to the processor for consolidation, forming and pressing.

The thermoplastic prepregs of the present invention are readily formed into three dimensional objects in conventional metal forming equipment using known fabricating techniques, and as such may be used in conventionally available metal working equipment, for instance by heating the thermoplastic prepreg external of the press, then quickly pressing in a press designed primarily for metal forming and fabricating. Because the prepreg is thermoplastic, excess materials or pressed articles not meeting the standard desired may be heated and remelted without significant loss of material.

To the best of our knowledge, there have not been available thermoplastic prepregs made from separated or discrete filaments and fibers, nor are there thermoplastic prepregs known in the art utilizing fibers as the thermoplastic resin source.

The smooth, mirror-like surface achieved by the process qualifies as a "Class A" surface. This high quality, smooth surface is achieved because the separated and discrete thermoplastic filaments provide a uniform, non-centralized flow of thermoplastic throughout the fiber reinforced mass, thus intimate blending and thorough intermixing of the thermoplastic fibers with the reinforcing fibers is essential to achieving a smooth, mirror-like surface. Because the fibers are discrete instead of bundled, a smooth surface finish can be obtained.

The reflectance characteristics responsible for the glossy appearance of high-gloss surfaces may be quantified according to ASTM D-523, Specular Gloss.

The use of structurally significant quantities of reinforcing fibers in the thermoplastic molding composition increases the heat distortion temperatures to which the material may be successfully subjected, and increases the impact strength and the stiffness as well. The proportion of reinforcing to thermoplastic fibers in the unconsolidated web represents a balance between engineering properties of the product on the one hand and a smooth, glossy surface on the other. Preferably the reinforcing fibers represent up to as much as 60% of the weight of the web or corrugated web prior to consolidation.

The products of this invention in addition to having a smooth, glossy surface are also well adapted to serve as structural products because of their relatively high (30%–40%) degree of reinforcement.

The thermoplastic component of the web preferably forms more than 50% by weight of the intimate blend and may consist of discrete thermoplastic fibers optionally supplemented with thermoplastic powders. One may employ commercially available thermoplastic fibers per se or thermoplastic materials which can be formed into fibers and separated into discrete filaments or staple fibers. The performance properties of the thermoplastic fibers will be selected in part based upon the use to which the glossy finish fiber reinforced molded product is to be placed. The thermoplastic component of the web must have a melt index under operational temperatures that will allow the thermoplastic to flow, displace air from the web and provide the smooth, glossy surface characteristic of the products of this invention. Melt indexes in the range of 30 to 50 are thus preferred, although as the reader will appreciate, the exact melt index will also be controlled by the temperature used for consolidating the web.

In the case of the consolidated sheet, the sheet is taken to an oven and heated beyond its melting point and then immediately transferred to a cold stamping press and stamped in a period of only about 10 to 15 seconds into the desired configuration, such as the fender of a car, a typewriter case, a sink, a helmet, a small boat or an aircraft seat.

In another arrangement, the thermoplastic sheet molding compound (SMC) unconsolidated web is placed into a hot mold in a low pressure hydraulic press which is maintained at a temperature above the melting point of the resin. The press is closed forcing the thermoplastic resin and reinforcing fibers to flow in the mold to provide a part having several varying thicknesses, with molded-in fastening points, ribs, etc., then removed from the mold and cooled. Parts made with this technology may include front or rear ends of automobiles, aircraft wing and tail sections, seating, luggage, radiators, fan shrouds, air and chemical duct work, packaging trays, microwave cookware, furniture, doors or sanitary ware as a replacement for vitreous ceramics.

The physical properties of the final fiber reinforced molded products offer the best possible surfaces of reinforced composites obtainable because of the use of discrete staple fibers or continuous filaments. The unique mixture of fiber reinforcements with the thermoplastic resins in fiber form allows air to be effectively eliminated from the web structure as the web is consolidated.

The intimately blended reinforcing and thermoplastic fibrous web is prepared as follows: Staple fiber (both thermoplastic and reinforcing) is taken from a bale, weighed, the individual fiber bundles opened and blended. The staple fiber for both the reinforcement (fiberglass, carbon, aramid) fibers and the thermoplastic (polypropylene, polyester, nylon) fibers are used in combination and are intimately blended together. The blend ratio may range from 10/90% to 60/40%, respectively, by weight. The proportion of thermoplastic to reinforcing fibers will vary depending upon the structural requirements of the article to be molded balanced against the need for a smooth, glossy surface appearance. The blend is processed on conventional textile equipment which opens the fiber bundles into discrete fibers and blends the reinforcement and resin fibers together. The fiber blend is preferably processed on textile air laying equipment which reduces breakage of the fibers (it is useful to maintain a high length to diameter ratio of the reinforcing fibers) and produces a web ranging from 0.25 to 4 ounces per square yard.

The web can be run through a corrugating machine which mechanically folds the web to produce corrugations, as described in U.S. Pat. No. 4,111,733, or simply accumulated as a continuous web on rolls.

The fibrous structure or web (optionally corrugated) is heated with pressure to eliminate air from the structure and to allow bonding of the resin matrix to form a sheet product or thermoplastic sheet molding compound. The sheet product may be molded into any desired two or three dimensional shape by heating followed by cold compression molding or stamping, or by simultaneously heating and molding the sheet by thermoforming.

The sheet product may be constructed from multiple webs plied one atop another and when consolidated produces an almost identically appearing product as described above.

Samples of reinforced consolidated sheets made according to the invention, including alternate fabrication and consolidation procedures, as well as comparative samples, were prepared according to Examples 1-5 and the samples were measured for gloss level. The results are reported in Table I that follows.

EXAMPLE 1

Polypropylene thermoplastic resin fibers (Amoco Type 10 color 1312) and reinforcing glass fibers (Owens Corning Fiberglas Type 700 cardable H-filament) were individually separated into discrete fibers then intimately blended in a 70% thermoplastic/30% reinforcement fiber ratio. The blend was processed on air laying equipment (Rando Webber Model #458, #RWP 792) producing a 0.6 oz./sq. yd. web 40 inches in width, and then corrugated according to the procedures described in U.S. Pat. No. 4,111,733 to produce a corrugated web of the intimately blended thermoplastic and reinforcing fibers.

A piece from the corrugated web was heated at 450° F. under pressure (10 psi) for three minutes between polished metal plates, cooled to ambient temperature and demolded to produce a reinforced thermoplastic sheet with gloss values of 27 at 20° and 64 at 60° measurements.

EXAMPLE 2

The procedure of EXAMPLE 1 was repeated this time using a mixture of 80% polypropylene fibers and 20% glass fibers (both fibers the same as in the previous example).

EXAMPLE 3

A pressed sample from 100% of the same polypropylene fibers using the same procedure as in EXAMPLE 1 was prepared.

In the same manner as EXAMPLE 1 a consolidated sheet was produced having the following construction: 80% polypropylene fibers (Hercules type 136, color #613) and 20% glass fibers (Owens Corning Fiberglas, Type 700, cardable H filament). A finished consolidated sheet of 100% polypropylene fibers (Hercules Type 136, color #613) was applied to both sides for a total construction fiber percentage of 80% polypropylene and 11% glass fibers.

EXAMPLE 5

For purposes of comparison, Azdel, a commercial composite composed of continuous strand glass fiber reinforced thermoplastic material manufactured by Azdel, Inc., was examined.

Specular Gloss Measurements—samples prepared in EXAMPLES 1-5 were measured for specular gloss on a Hunter Dr. Large RL-3 device (Hunter Associates Laboratories, Inc., Reston, Va.) at measurement angles of 20 °, 60° and 85° according to ASTM D-523. Gloss levels measured for each of the 5 examples were as follows:

TABLE I

| GLOSS LEVELS OF REINFORCED COMPOSITES | | |
|---|---|---|
| ANGLE OF MEASUREMENT | | |
| 20° | 60° | 85° |
| 1 | 23.7, 29.4 | 63.1, 64.5 | 80.9, 84.5 |
| 2 | 39.3, 40.6 | 74.4, 74.4 | 92.1, 91.5 |
| 3 | 57.8, 56.8 | 78.2, 78.2 | 94.9, 96.0 |
| 4 | 50.9, 50.1 | 70.9, 70.7 | 92.6, 93.5 |
| 5 | 5.2, 5.3 | 30.6, 40.4 | 66.3, 74.2 |

EXAMPLE 6

Polypropylene thermoplastic resin fibers (Amoco Type 10 color 1312) and reinforcing glass fibers (Owens Corning Fiberglas Type 700 cardable H-filament) were individually separated into discrete fibers then intimately blended in a 70% thermoplastic/30% reinforcement fiber ratio. The blend was processed on air laying equipment (Rando Webber Model #458, #RWP 792) producing a 0.6 sq. yd. web 40 inches in width, and then corrugated according to the procedures described in U.S. Pat. No. 4,111,733 to produce a corrugated web of the intimately blended thermoplastic and reinforcing fibers.

A piece from the corrugated web was heated at 450° F. under pressure (10 psi) for three minutes between polished metal plates, cooled to ambient temperature and demolded. Subsequently, a polypropylene powder (50 grams, Exxon type PP 5215-GE) incorporating 3% of a black pigment (Morton Thiokol, Inc., Advance Glass Automate Black 104) is applied to the surface of the consolidated polypropylene and fiberglass composite as described above.

The coated consolidation was heated at 450° F. under pressure (10 psi) for three minutes between polished metal plates, cooled to ambient temperature and demolded to produce a grey reinforced thermoplastic sheet having a black surface. Both surfaces were lustrous and shiny.

What is claimed is:

1. A consolidated, heat and pressure-molded fiber reinforced thermoplastic composition produced from a non-needled non-woven of discrete reinforcing fibers and thermoplastic fibers, devoid of liquid binders and distinctly different fiber layers or alternating distinctly different layers, suitable for cosmetic or appearance applications, having a surface appearance value recorded at 20° and 60° gloss angle measurement for ASTM standard D-523 exceeding 10 and 50, respectively, thermoplastic material from providing the matrix for reinforcing fibers in the molded product.

2. The composite of claim 1 composed of inorganic fibers in a thermoplastic matrix.

3. The composite of claim 1 consisting of multiple consolidated layers.

4. A corrugated, unconsolidated fibrous web of discrete inorganic and/or organic reinforcing fibers and thermoplastic fibers blended together in a weight ratio of about 10:90 to about 60:40, and formed into a non-needled, loose non-woven web of discrete fibers, devoid of liquid binder.

5. A consolidated heat and pressure molded thermoplastic sheet having an automotive Class A glossy surface finish produced by consolidation of an unconsolidated fibrous non-woven web of discrete reinforcing fiber intimately blended with discrete thermoplastic fibers having a melt index in the range of about 2 to about 500, the reinforcing and thermoplastic fibers present in a weight ratio of about 10:90 to about 60:40, devoid of liquid binders and distinctly different fiber layers or alternating distinctly different layers, thermoplastic material from melted thermoplastic fibers providing the matrix for reinforcing fibers in the molded product.

6. A consolidated heat and pressure molded thermoplastic sheet having an automotive Class A glossy surface finish produced by consolidation of an unconsolidated corrugated fibrous non-woven web of discrete reinforcing fiber intimately blended with discrete thermoplastic fibers having a melt index in the range of about 2 to about 500, the reinforcing and thermoplastic fibers present in a weight ratio of about 10:90 to about 60:40, devoid of liquid binders and distinctly different fiber layers or alternating distinctly different layers, thermoplastic material from melted thermoplastic fibers providing the matrix for reinforcing fibers in the molded product.

7. A consolidated, heat and pressure molded thermoplastic sheet having an automotive Class A surface finish produced by subjecting a starting material devoid of distinctly different fiber layers or alternating distinctly different layers and liquid binder and containing from 10 to 60% by weight discrete reinforcing fibers, blended with fibers of thermoplastic resin, the blend resulting in the form of a loose non-woven web, to heat and pressure, thermoplastic material from melted thermoplastic fibers providing the matrix for reinforcing fibers in the molded product.

8. A shaped, three-dimensional article made of the thermoplastic sheet of claim 7.

9. A process of making a three-dimensional shaped article comprising heating the thermoplastic sheet of claim 7 pressing the heated sheet into the desired shape.

10. The process of claim 9 in which the sheet is heated and pressed simultaneously.

11. A process of preparing a fiber reinforced thermoplastic molded product having a glossy surface, the process comprising the steps of:
  (1) opening the fiber bundles of a reinforcing fiber into discrete staple filaments;
  (2) opening the fiber bundles of a thermoplastic fiber into discrete stale filaments;
  (3) blending, without addition of liquid binder, the discrete reinforcing fibers and thermoplastic fibers in a weight ratio of about 10:90 to about 60:40 and forming the blended fibers into a non-needled non-woven web where the fibers are discrete, as opposed to in a bundle or mat; and
  (4) heating the web to at least the melting point of the thermoplastic fibers and applying pressure to the web to cause the thermoplastic fibers to melt, eliminating air from the web, and pressing the non-woven web into a consolidated sheet, thermoplastic material from melted thermoplastic fibers melted thermoplastic fibers providing the matrix for reinforcing fibers in the molded product.

12. The process of claim 11 in which the web of step (3) is corrugated prior to consolidation step (4).

13. The process of claim 11 or 12 in which the reinforcing fibers are glass, carbon, aramid, steel or mixtures thereof.

14. The process of claim 11 or 12 in which thermoplastic powder is added to the web prior to consolidation.

15. The process of claim 11 or 12 in which the reinforcing fibers constitute up to 60% by weight of the web and the balance is substantially thermoplastic fibers.

16. The process of claim 11 or 12 in which the thermoplastic fibers have a melt index in the range of about 2 to about 500.

17. The process of claim 11 or 12 in which the resulting product has a surface gloss value of at least 10 at 20° and 50 at 60° measurements.

18. A process according to claim 11 in which multiple web layers are consolidated prior to heating of the thermoplastic to its melt point.

19. A process according to claim 11 in which multiple layers are heated and fused in separate steps.

20. A process according to claim 11 in which multiple layers are heated and fused in sequential steps.

21. A process according to claim 19 in which the sequential step is fusing a layer of fibers or fiber incorporating powder to or on a film of thermoplastic polymer.

* * * * *